(12) United States Patent
Pryor

(10) Patent No.: US 10,446,059 B2
(45) Date of Patent: Oct. 15, 2019

(54) HAND MOTION INTERPRETATION AND COMMUNICATION APPARATUS

(71) Applicant: Thomas William Pryor, Seattle, WA (US)

(72) Inventor: Thomas William Pryor, Seattle, WA (US)

( * ) Notice: Subject to any disclaimer, the term of this patent is extended or adjusted under 35 U.S.C. 154(b) by 0 days.

(21) Appl. No.: 15/371,693

(22) Filed: Dec. 7, 2016

(65) Prior Publication Data

US 2018/0158370 A1    Jun. 7, 2018

(51) Int. Cl.
*G09B 21/00* (2006.01)
*G10L 13/00* (2006.01)

(52) U.S. Cl.
CPC ............ *G09B 21/009* (2013.01); *G10L 13/00* (2013.01)

(58) Field of Classification Search
CPC .............................. G09B 21/00; G09B 21/009
See application file for complete search history.

(56) References Cited

U.S. PATENT DOCUMENTS

| | | | |
|---|---|---|---|
| 2010/0023314 A1* | 1/2010 | Hernandez-Rebollar | .................... G06F 3/017 704/3 |
| 2016/0162022 A1* | 6/2016 | Seth | ........................ G06F 3/017 345/156 |
| 2017/0031446 A1* | 2/2017 | Clark | ................... G05D 1/0016 |

* cited by examiner

*Primary Examiner* — Bruk A Gebremichael
(74) *Attorney, Agent, or Firm* — Perkins Coie LLP

(57) ABSTRACT

A hand motion interpretation and communication apparatus for continuously translating hand motions as they represent sign-language into words and phrases to allow for rapid audio and visual communication of that sign-language. Hand motions are converted into electronic signals by eight variable-resistance flex sensors located on the fingers, one accelerometer, and one inertial momentum unit. Movement and positional signals are carried to a central processing unit to be transliterated. The accurate positional signals are interpreted and compared to an internal library of vocabulary. Recognized vocabulary can be immediately displayed as text or vocalized as speech via a speech synthesizer. The internally powered apparatus is completely portable and flexible allowing for free movement of the hand, wrist, fingers, and body.

13 Claims, 3 Drawing Sheets

HAND MOTION INTERPRETATION AND COMMUNICATION APPARATUS

BACKGROUND OF THE INVENTION

The present invention relates to an apparatus for sensing hand and finger position, orientation, and movement to interpret that information as it represents sign-language and outputting text and/or speech. This invention is specifically purposed toward the translation of sign language into sentences in the form of text and/or speech in a practical and ergonomic fashion to allow for easy and rapid communication.

Sign-language is prevalent among many different communities, such as the Deaf community. This method of communication is fast and effective for members of this community to communicate amongst themselves. However, like with every language, those who do not know sign-language face a significant barrier to communicating with users of sign-language. This barrier can impact both personal and professional opportunities. Providing sign-language using communities with the ability to rapidly communicate with those who do not understand sign-language through verbal and text speech could allow individuals to overcome these obstacles. What is needed is a way to bridge the gap between those who know sign language and people who can talk and hear who do not know sign-language.

The potential benefit of a way to facilitate better communication between these two groups is increasingly apparent when the sheer number of American Sign Language (ASL) speakers in the United States is considered. ASL is the native language of 500,000 to two million speakers in the United States alone. Outside of native speakers, an estimated 15 million people can communicate in sign language in the United States.

This hand motion interpretation and communication apparatus helps those who use sign-language as their primary form of communication to be able to communicate with other people who can hear but do not know sign language.

This hand motion interpretation apparatus aids those who do not know sign-language to learn more rapidly by hearing what words they are signing via the devices transliteration process and voice synthesizer.

Motion recognition and capture technology is advancing to become an integral part of everyday life. Specifically gesture recognition technology can be found in both recreational and military devices. The XBOX KINECT and the NINTENDO WII have infiltrated many people's homes and extensively utilize gesture capture software and technology to allow users to wirelessly interact with their devices. The military utilizes accurate gesture recognition (ANTRHOTRONIX NUGLOVE) to allow combat medics to effectively remote control robots, reducing the risk posed to medics in the field. Gesture recognition is becoming a more integral part of everyday life.

Sign-language gestures can be described in terms of three components: hand shape, location, and movement of the hands. Hand shape is the static component of a sign. This component comprises what is known as a "posture." Sign-languages contain many of these unique postures, these postures are used to spell names or uncommon words that are not defined to a great extent in the dictionary. Even with these unique postures, sign-languages contain several signs that are very similar to each other. Those signs with a closed first are particularly difficult to distinguish with an untrained eye.

Due to the difficulties in visually distinguishing certain signs it can be difficult for visual based systems to properly recognize and interpret the signs.

There have been attempts to create hand motion interpretation apparatuses in the past, but a problem faced by these inventions is that their technology was not ergonomic nor practical for everyday use. The barriers to communication faced by the sign-language using community are everyday problems, and the technology must be convenient for that use. Physical based hand gesture interpretation apparatuses must not be cumbersome, restrictive, or unnatural to allow the user to easily create recognizable signs. Prior inventions serve their primary purposes in research and development. Additionally, prior hand gesture interpretation technology has not yet integrated advancements in computer processing and wireless communication.

As with other languages, every speaker or group of speakers will have small differences in their speech or signing. These differences can be found among signers of different ages, experience, or geographic location. The exact way the sign is done will vary but the underlying sign remains the same. Therefore, any interpretation system intended to recognize signs has to be able to classify signs, regardless of variation based on individual styles, accurately. In prior devices in this area of technology, a trade-off has had to be made, the sign-language user has sacrificed freedom of sign choice due to the limitations of the device.

Prior approaches have focused on methodologies for accomplishing sign-language transliteration: the hand alphabet which is used to fingerspell words, and complete signs which are formed by dynamic hand movements.

The outcome of these two methodologies was the creation of two classifications of inventions: video-based and instrumented. The video-based approach seemed to have a distinct advantage: the signer had complete freedom to sign and move without physical instruments attached to them. A camera with a limited field of view would monitor the hand movements and shape which limited the area of operation of signer. The signer would need to stay in the field of view of the camera or array of cameras. An additional limitation of this technology is the required processing power to handle the large amount of data created by video-based instruments. The complexity of the computer equipment required would be much higher as would be the expense.

On the other hand, to capture the dynamic nature of hand motions, it is necessary to have multiple sensors closely attached to a signer's hands or arm to measure position of the hand and fingers. For an instrumented approach, this has often included bulky instrumentation attached to a person. The data gathered by the sensors in such a device is also complex, requiring a physical connection to a desktop computer or laptop to transfer positional information. This physical connection to a computer limits the signer's freedom in multiple ways. A user of the device could not move far from the computer, nor could they physically move their arm freely as it is attached to the computer. In some cases, these gloves were complemented by infra-red, ultrasonic or magnetic trackers to capture movement and hand location. The drawback of these types of trackers is that they force the signer to remain close to the radiant source and inside a controlled environment free of interference (magnetic or luminescent) or interruptions of line of sight.

A number of hand motion recognition and interpretation systems have been proposed. Examples of these prior devices are disclosed in U.S. Pat. No. 5,699,441 to Sagawa et al., U.S. Pat. No. 8,140,339 to Hernandez-Rebollar, U.S. Pat. No. 9,098,493 to Tardif.

BRIEF DESCRIPTION OF THE DRAWINGS

The following is a brief description of the drawings, in which.

DETAILED DESCRIPTION OF THE INVENTION

Figure 1:
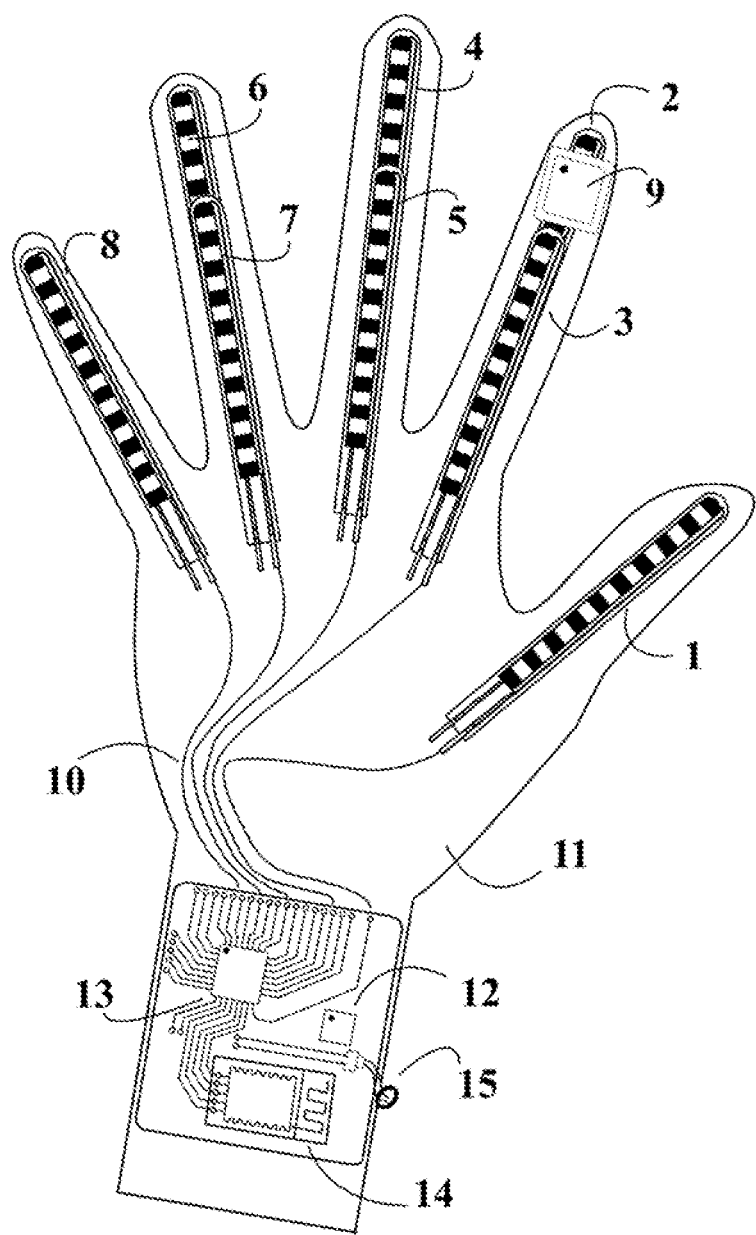
FIG. 1 is a top down view of the input apparatus on the glove showing the sensors and circuitry in one embodiment of the left glove of the invention.

The present invention is directed to an apparatus for capturing the movement of the hands and transliterating those movements into speech and text. More specifically, the present invention is directed to an apparatus for recognizing sign-language gestures and transliterating them into speech and text.

A primary aspect of the invention is to provide an apparatus that is able to detect, accurately, full hand, including fingers, position and movement for any individual user regardless of hand size or signing style. Hand and finger position and movement information is collected by multiple sensors to provide this data to a transliteration device such as a central processing unit (CPU) and create output as text or speech.

Another aspect of the invention is to provide an apparatus for transliterating full hand gestures, including fingers, into speech and text by providing a sensor on the back of the hand to detect motion and orientation of the hand.

Another aspect of the invention is to provide an apparatus for transliterating full hand gestures, including fingers, into speech and text where the positional information is collected and transliterated all in the same device without the need for external computation.

A further aspect of the invention is to provide an apparatus for transliterating full hand gestures, including fingers, into speech and text where transliterated output can be transmitted wirelessly to external devices, such as a screen, speaker, or other computer.

The invention also includes electronic circuitry connected to multiple sensors that detect the movement and orientation of the hand and fingers, then compares the detected movement and orientation, with a recognition process, against a pre-defined library to generate corresponding words or phrases which are then converted into synthesized speech or text.

The various aspects of the invention are attained by providing a hand motion interpretation and communication apparatus comprising a hand motion input apparatus for simultaneously detecting and transliterating sign-language. This input apparatus comprises two gloves worn by the user. The gloves have sensors on the fingers and on the back of the hand for detecting the flexing of the fingers and the orientation of the hand, respectively. The hand motion input apparatus detects the position of each finger and movement and position of the hand itself, of both hands. The data collected by the sensors generate values corresponding to morphemes. Within the device or external to the input apparatus, a device containing a pre-defined dictionary of sign language gestures in the form of morpheme sequences, receives the values, matches the value with a stored morpheme and generates an output corresponding to that morpheme. Morphemes in this case refer to linguistic units, the smallest distinguishable unit to make up part of a sign. Morphemes can be combined according to the appropriate syntax to form signs, thus a series of signs will generate morphemes which then combined create phrases.

The aspects of the invention are further attained by providing a computer is connected to or attached to the input apparatus which will generate output based on the values recorded by the input apparatus. This output will be for producing synthesized speech or visual text for the corresponding gestures or sign-language. This is accomplished by a process for transliterating a hand gesture or sign into a morpheme.

Because every individual has a different starting stance and will hold their hands at a different start position, an initial calibration of the apparatus to the user provides increased accuracy of initial signs. The input apparatus is calibrated by turning the apparatus on, at which time the central processing unit will read the voltages from the plurality of sensors on the gloves. After brief time the minimum and maximum voltages are set and the input apparatus' central processing unit reads data from sensors located on the index finger and wrist to establish the initial hand position. These values are set to zero, at which point the primary sign recognition process begins.

This process operates to interpret the position, posture, and gesture of a user's hand and compare this information against a dictionary of signs to produce output such as text and audio. Such a sign dictionary may be sorted into various template hand postures or positions. A sign dictionary is compiled by collecting all available signs for the targeted sign language and sorting them by template hand postures, positions, and gestures. The signs have corresponding values for these attributes and thus can be matched to an inputted sign accordingly.

By first identifying and matching such templates to a user's current hand posture it is possible to quickly and accurately identify the sign from a sign dictionary. To this end, the process will first receive a data frame, the position and posture of the hand, from the central processing unit and determine whether a template hand posture is matched. If no such template is matched to the current position, then the process will prompt the retrieval of another data frame. If such a template is matched, then the current hand position data is calculated based on information from the aforementioned inertial measuring unit and accelerometer. Once a template has been identified the sign dictionary is narrowed to only signs that possess the detected template. The process then continues to collect hand posture information from which it will use the hand posture frames to eliminate any signs that fail to match, until only one sign remains. This sign is then outputted as text and speech.

The present invention is directed to an apparatus for detecting hand movement as sign-language and translating that movement into speech and text. The apparatus includes a plurality of sensors, including an accelerometer and flex sensors, to detect hand and finger orientation. These sensors are connected to an electronic circuit that will convert the informational signals from said sensors into speech and text.

This apparatus in one embodiment is adapted for detecting and converting sign language, specifically American Sign Language. In one embodiment, the invention is adapted for detecting hand posture, position, and gesture and converting that information into written text or synthesized voice. Said synthesized voice or text, in the embodiments described herein, is in English although non-English languages can be produced. The embodiments described herein refer to American Sign Language, but are not limited to sign language.

Referring to FIG. 1, the apparatus for capturing hand posture, position, and gesture and matching the hand movements and gestures to corresponding sign language. The apparatus is able to detect the changes in a hand's posture, position, and gesture independently from the body of the user. The apparatus is connected to the hand of the user to detect hand posture, position, and gesture. In the embodiment shown in FIG. 1, the apparatus is not attached to a hand and shows only one glove for purposes of illustration. In another embodiment of the invention, the apparatus will be found on both hands to simultaneously detect hand posture, position, and gesture of both of the user's hands. The data collected from the sensors of each glove will be supplied to a central processing unit located on the back of the glove and translated into written text or speech. The apparatus can detect and translate complete signs, individual letters, words and a combination thereof.

As shown in the embodiment of FIG. 1, the input apparatus includes a glove made of a flexible material 11 to fit the user's hand and includes a plurality of sensors to measure and detect hand posture, position, and gesture. Each of the apparatus' digits include a sensor 1 to 8 to detect the flexing of the respective finger. In embodiments of the invention, the sensors 1 to 8 are variable flex sensors to detect the gesture and bending of the respective fingers. On the index finger a sensor 9 will detect the angular position of the finger. In embodiments of the invention, the sensor 9 is an accelerometer to detect the absolute angular position of the finger with respect to gravity.

One sensor 12 is positioned on the back of the hand to detect hand gesture and posture. In one embodiment, the sensor 12 is an inertial measurement unit. This sensor 12 is positioned so as to measure the force and angular rate including pitch, roll, and yaw of the hand, providing the precise gesture, position, and posture of the hand in three dimensions. In one embodiment, sensor 12 includes a 9-axis inertial measurement unit.

In the embodiment illustrated, the sensors are embedded in a flexible material that makes up the entire glove 11 to be put on and removed by the user, with one glove on each hand. The glove 11 is typically made of a lightweight fabric or other material with adjustable members to provide a secure but flexible fit. In some embodiments the sensors may be imbedded in mesh lining a lightweight fabric material.

As shown in FIG. 1, the input assembly also includes an electronic circuit including a central processing unit 13, a wireless communication module 14, and connection to a power supply 15. In one embodiment, the central processing unit 13 will receive input from the plurality of sensors, 1 to 8, 9, and 12, and recognize signs and translate those signs. In one embodiment, the wireless communication module 14 is a BLUETOOTH transmitter. In one embodiment of the invention, transliterated signs may be wirelessly transmitted by the wireless communication module 14 to a display and speaker or another computer such as a personal laptop.

This apparatus is able to detect a sign by comparing the hand posture, position, and gesture against a dictionary. Hand posture is determined from the flex sensors 1 to 8 on the gloves and from the sensor 9 on index fingertip. Hand position and gesture are determined from the inertial measurement unit 12 located in this embodiment on the wrist of the gloves. Hand gesture is likewise determined form the inertial measurement unit 12 on the wrist of the gloves. The central processing unit 13 checks during a specified interval of time the changes in posture and position from the inertial measurement unit 12 to determine what gesture was performed by the user.

The apparatus accomplishes sign interpretation and output via a process that takes into account three attributes for a sign in a sign dictionary. A sign in the glove's sign dictionary has three attributes: hand posture, hand position, and hand gesture. Hand posture is determined from the plurality of sensors on the digits 1 to 8 of the glove and the sensor on the index fingertip 9. The central processing unit 13 will not look for changes in the hand posture, it is static. Hand position is determined from the sensor on the wrist of the gloves, in one embodiment this sensor is an inertia measuring unit. The gloves will also not look for changes in this attribute. Hand gesture is determined from the same sensor, the sensor on the wrist of gloves. In one embodiment, this sensor is an inertial measurement unit. Hand gesture is a dynamic attribute for which the central processing unit will look at intervals of time for changes in readings from the inertial measurement unit. These readings will be used to determine what gesture was performed by the user.

Figure 2:
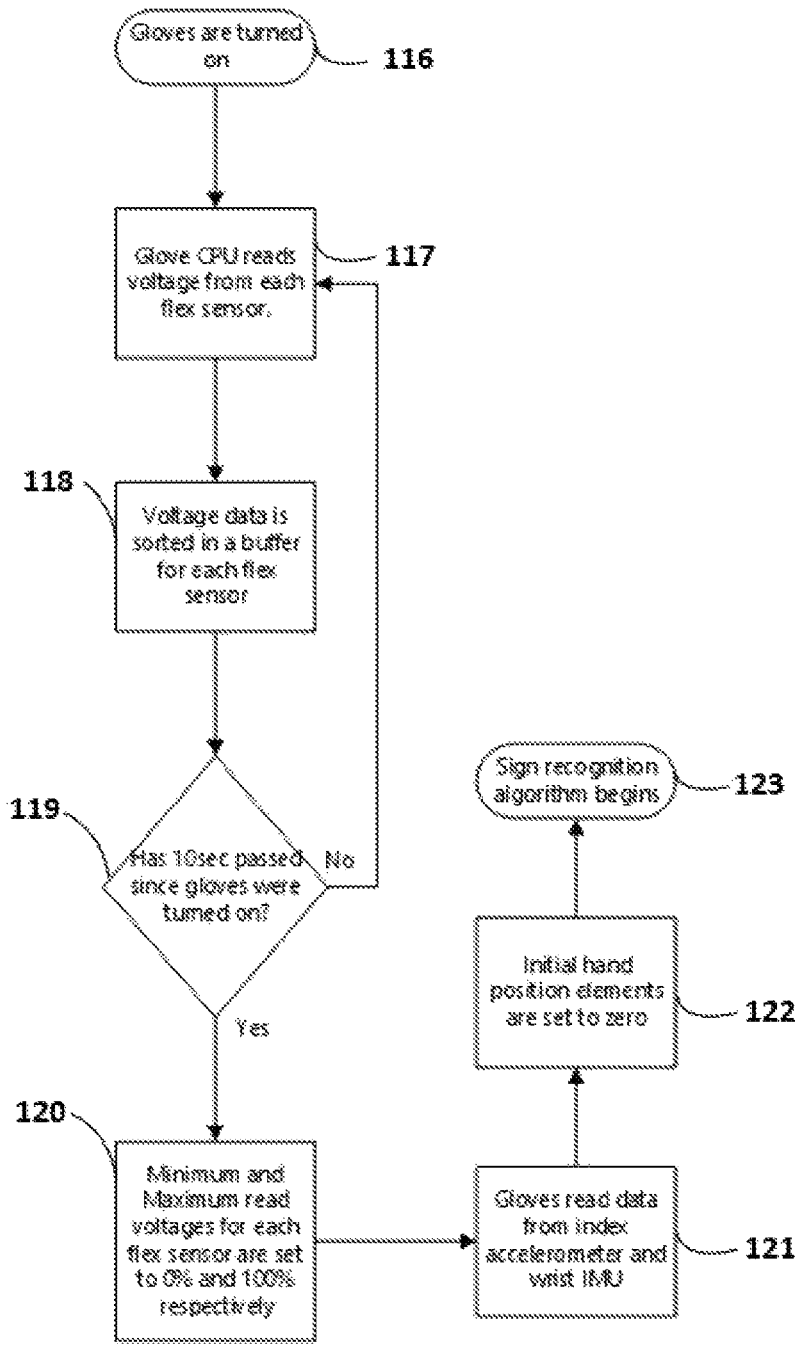
FIG. 2 is a block diagram depicting the method of calibration that would be used to orient the glove to a particular user in one embodiment of the invention.

As shown in FIG. 2, prior to any data arriving at the central processing unit 13 the plurality of sensors 1 to 8 may be calibrated to the user's hands. When the input apparatus is initially turned on at step 116, the central processing unit 13 is recording the sensors' 1 to 8 smallest and the largest analog value at step 117. This data is then stored in a buffer for each sensor 1 to 8 at step 118. The central processing unit 13 checks if ten seconds has passed since it received power at step 119, if so then it will set the minimum and maximum voltages for sensors 1 to 8 at 0% and 100%, respectively at step 120. These percentages represent the flex in a user's joint. In this embodiment, a value of 100 would correspond to no flex in the joint and 0 would correspond to complete flex. The central processing unit then reads data from sensor 9 and sensor 12 at step 121. Using this data, the central processing unit 13 sets the current hand position elements to a zero at step 122. The central processing unit 13 then begins the sign recognition process, step 123.

In one embodiment, output of a sign's corresponding text and speech by such a process is only triggered if the central processing unit determines each of three sign attributes to be within a specific error range. When the attribute being measured is a dynamic attribute, such as hand gesture, data is taken sequentially for a specified interval of time and each data point for the dynamic attribute must satisfy a margin of error for a static attribute for each instance in a specified interval of time. In one embodiment, a specified interval of time at which the data is sequentially taken is 0.5 seconds. In one embodiment, data collected at a rate of once every 1/50th of a second, resulting in a gesture template of 25 separate sequential measurements. In this embodiment, each gesture template measurement will contain a set of seventeen numbers. These numbers correspond to the three attributes of a sign. The first eleven numbers correspond to the hand posture attribute, these numbers will correspond to the readings of sensors 1 to 8 and sensor 9. The last three numbers are used to determine hand gesture, the wrist's acceleration along the x, y, and z axis.

For a measurement to satisfy the hand gesture requirement of a sign in the sign dictionary, all three of the time dependent measurements must match the template gesture measurement within a specified total difference for all the sets. In one embodiment, these measures are the X, Y, and Z components of the angular acceleration as measured by sensor 12. In one embodiment, the total difference has a value of 40. The readings for each parameter must also match the template parameters within a specified difference. In one embodiment, the reading matches if the difference has a value less than 65.

Figure 3:
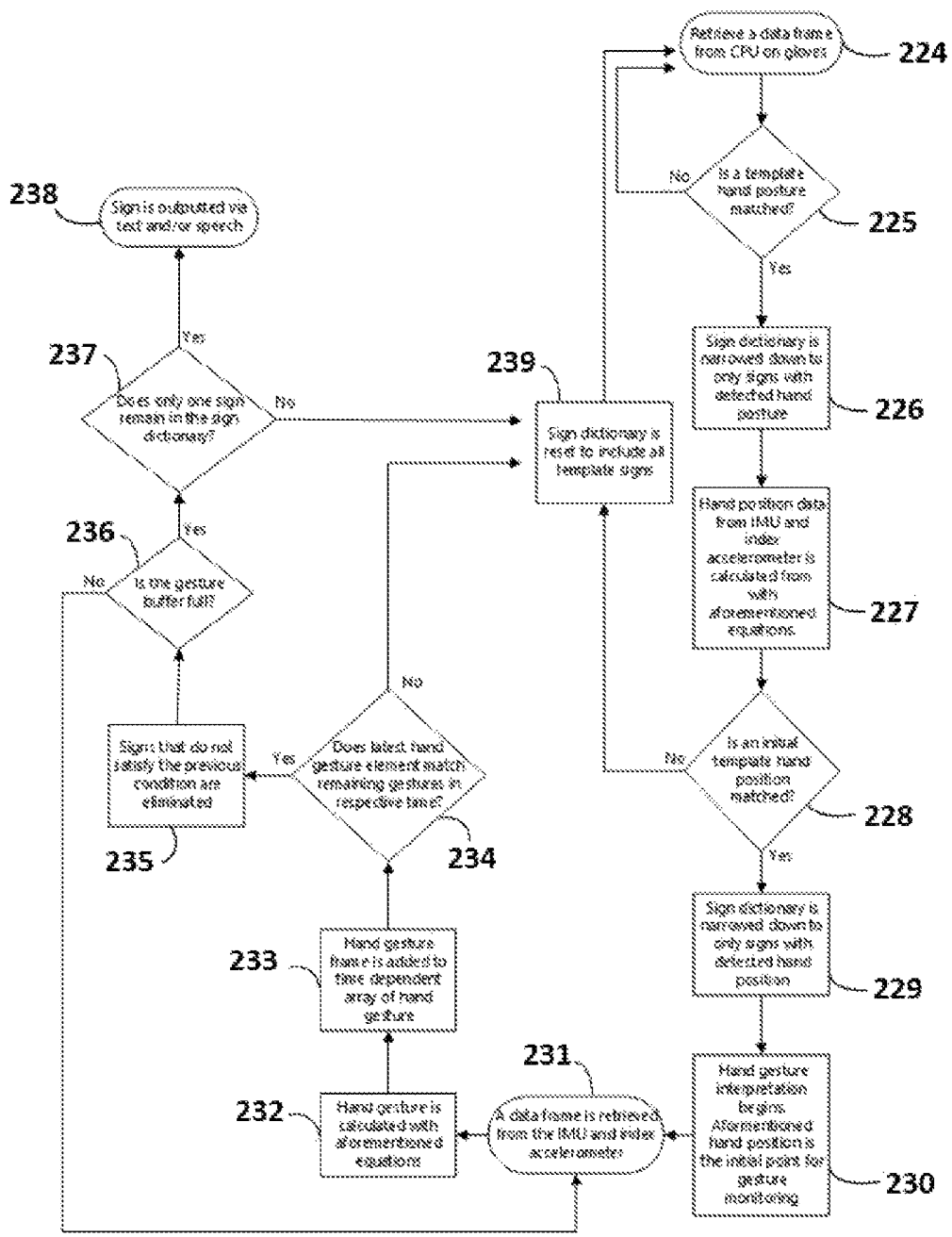
FIG. 3 is a block diagram depicting the method of transliterating hand motions into visual or audible output.

Referring to FIG. 3 at step 224, each of these readings by the central processing unit 13 of sensors 1 to 8, sensor 9, and sensor 12 creates a data frame to be passed through the motion interpretation and transliteration process. This data frame contains the three attributes of the sign as read by the central processing unit 13 from the plurality of sensors 1 to 8, 9, and 12.

Of these attributes, the process first determines whether the read hand posture measurements match a template hand posture at step 225. For a measurement to satisfy the hand posture requirement of a sign in the sign dictionary, the numbers corresponding to the finger positions must match the template hand posture for that sign within a specified difference. In one embodiment, these measurements are taken from the readings of sensors 1 to 8. In one embodiment, the difference is calculated by subtracting the measured finger position value from the template position value. In one embodiment, this difference has a value of 5. In one embodiment, the measurements from the readings of sensor 9 must also match the template readings within a specified difference. In one embodiment, this difference has a value of 40. If such a template hand posture is matched the sign dictionary is narrowed to only signs that have the values of the detected hand posture at step 226.

After the possible signs have been narrowed in step 226 the process will then calculate the hand position data from sensor 9 and 12 during step 227 and determine whether there is an initial hand position match at step 228. For a measurement to satisfy the hand position requirement of a sign in the sign dictionary, the x, y, and z positions are determined and must match the template hand position within a specified difference. In one embodiment, this difference has a value of 85. In one embodiment, hand position measurements are taken from the readings of sensor 12. In one embodiment, the difference is calculated by subtracting the measured hand position values from the template hand position values. As a user moves their hand the sensor 12 records the change in orientation and acceleration. The x, y, and z vector components of the orientation of the hand are determined and their respective orientations are projected onto an initial coordinate system determined during calibration, as shown in FIG. 2 at step 121. The central processing unit 13 calculates the current hand position values for each axis utilizing the following equations:

$$X = X_{old} + \int\int_0^t a_X dt \quad Y = Y_{old} \int\int_0^t a_Y dt \quad Z = Z_{old} \int\int_0^t a_Z dt$$

Where t is the time since the last measurement, a is the acceleration from sensor 12, and $X_{old}$, $Y_{old}$, and $Z_{old}$ are the previously measured positions calculated from the equations. If the calculated hand position data matches with a template hand position in step 228 then the process will narrow the sign dictionary to search for only signs having that template hand position at step 229. However, if the initial template hand position is not matched given the calculated values, the process will reset the sign dictionary to include all template signs at step 239, including those that had matched for hand posture in step 225 resulting in the narrowing of the dictionary in step 226. The process will then repeat steps 224, 225, 226, 227, and 228 using newly retrieved data frames read from the sensors 1 to 8, 9, and 12 by the central processing unit 13.

After the sign dictionary is narrowed by template hand positions in step 229 the process will then interpret hand gesture measurements from the data frame in step 230. The hand position calculated in step 227 is the initial point for gesture monitoring in step 230. Gesture monitoring, collecting measurements necessary to calculate hand gesture values, occurs by receiving a data frame from sensors 9 and 12 in step 231. Hand gesture values are then calculated by using the equations mentioned above in step 232. The calculated hand gesture values taken as a frame are then added to a time dependent array of hand gestures at step 233. The process then takes the most current hand gesture frame and its respective time and compares that to the remaining signs in the sign dictionary at the respective time at step 234. If no matching sign is found, the process will reset the sign dictionary to include all template signs at step 239, including those that had matched for hand posture in step 225 and hand position in step 228. If there are matching signs in the sign dictionary, the process will eliminate all other non-matching signs at step 235. The process will continue to monitor hand gestures until the time dependent array of hand gestures is full, which is determined at step 236. Once the gesture buffer is full as determined by step 236 the process checks whether only one sign remains in the dictionary at step 237. If the sign dictionary has been reduced to one sign the process will retrieve the sign's corresponding text and speech which is then outputted via display or speakers at step 238.

In an alternative embodiment of the invention, data frames containing the hand measurements collected from sensors 1 to 8, 9, and 12 are wirelessly transmitted as a packet of information by the wireless communication module 14. The data frame is received by a wireless receiver attached to a central processing unit, which then applies the process as shown in FIG. 3 at step 224 and onward. This receiving computer may then output speech through speakers and text via a display.

What is claimed is:

1. A hand motion interpretation and communication apparatus comprising:
   a hand motion input device including two gloves, each glove configured to be worn on a user's hand and fingers, wherein each glove includes a plurality of sensors attached thereto, wherein the plurality of sensors includes—
      a plurality of variable-resistance flex sensors, wherein at least two variable-resistance flex sensors are configured to be positioned over each of the index finger, middle finger, and ring finger of the user, and wherein at least one variable-resistance flex sensor is configured to be positioned over each of the thumb and pinky of the user;
      an accelerometer configured to be positioned over the tip of the index finger of the user; and
      an inertial measurement unit configured to be positioned over the back of the hand or wrist of the user;
   a central processing unit adapted to—
      receive input signals from the plurality of sensors;
      detect (a) a posture of each hand of the user based on input signals from the variable-resistance flex sensors and the accelerometer, and (b) a position and a gesture of each hand of the user based on input signals from the inertial measurement unit; and
      determine a predefined sign corresponding to the detected posture, position, and gesture; and
   a communication module for receiving and communicating data from the central processing unit.

2. The hand motion interpretation and communication apparatus according to claim 1, wherein the plurality of sensors is embedded in the corresponding glove.

3. The hand motion interpretation and communication apparatus according to claim 1, wherein the inertial measurement unit is a nine-axis inertial measurement unit.

4. The hand motion interpretation and communication apparatus according to claim 1, wherein the communication module is wireless.

5. The hand motion interpretation and communication apparatus according to claim 1, wherein the central processing unit is connected to a speech synthesizer for creating a spoken sentence based on the determined predefined sign.

6. The hand motion interpretation and communication apparatus according to claim 1, wherein the central processing unit is connected to a display for creating a visual depiction of the predefined sign.

7. The hand motion interpretation and communication apparatus according to claim 1, wherein the central processing unit is further adapted to determine the predefined sign corresponding to the detected posture, position, and gesture from a plurality of signs stored in a database, by—
   identifying a first subset of signs stored in the database based on the detected posture;
   identifying at least a second subset of signs, from the first subset, based on the detected position; and
   identifying the single predefined sign from the second subset based on the detected gesture.

8. A hand motion interpretation and communication apparatus comprising:
   a hand motion input device including two gloves, each glove configured to be worn on one of a user's hands and fingers, wherein each glove includes a plurality of sensors attached thereto, the plurality of sensors including—
      at least eight variable flex sensors for measuring finger flex positions, with at least two variable-resistance flex sensors per index finger, middle finger, and ring finger and at least one variable-resistance flex sensor per thumb and pinky,
      an accelerometer positioned over the tip of index finger, and
      an inertial measurement unit over the back of the hand or wrist;
   a central processing unit adapted to—
      receive input signals from the sensors of each glove,
      detect (a) a posture of each of the hands of the user based on input signals from the variable-resistance flex sensors and the accelerometer, and (b) a position and a gesture of each of the hands of the user based on input signals from the inertial measurement unit; and
      determine at least one predefined sign corresponding to the detected posture, position, and gesture of each hand; and
   a communication module for receiving and communicating data from the central processing unit; and
   a speech synthesizer connected to said central processing unit for synthesizing spoken words from the determined at least one predefined sign.

9. The hand motion interpretation and communication apparatus according to claim 8, wherein the inertial measurement unit is a nine-axis inertial measurement unit.

10. The hand motion interpretation and communication apparatus according to claim 8, wherein the communication module is wireless.

11. The hand motion interpretation and communication apparatus according to claim 8, wherein the central processing unit is connected to a display for creating a visual depiction based on the at least one predefined sign.

12. The hand motion interpretation and communication apparatus according to claim 8, wherein the central processing unit is further adapted to determine the at least one predefined sign by matching the determined posture to predefined postures on an external storage device and returning all possible matches and filtering these matches by comparing the determined position and gesture against predefined positions and gestures to generate the most probable matching predefined sign.

13. A hand motion interpretation and communication apparatus comprising:
   a hand motion input device including two gloves, each glove configured to be positioned over a hand and fingers of a user for capturing movement patterns of the user's hand and fingers, the input device having a plurality of sensors, wherein the plurality of sensors includes—
      at least eight variable-resistance flex sensors for measuring finger flex positions wherein, when the glove is worn by the user, at least two variable-resistance flex sensors are positioned over the index finger, middle finger, and ring finger of the user and at least one variable-resistance flex sensor is positioned over the thumb and pinky of the user;
      an accelerometer wherein, when the glove is worn by the user, the accelerometer is positioned over the tip of the index finger of the user; and
      an inertial measurement unit;
   the input device outputting signals on signaling lines from the sensors;
   a central processing unit adapted to receive the signals on the signaling lines and configured to—
      detect (a) a posture of each hand of the user based on signals from the variable-resistance flex sensors and the accelerometer, and (b) a position and a gesture of each hand of the user based on signals from the inertial measurement unit;
      determine a predefined sign corresponding to the detected posture, position, and gesture by matching the determined posture to predefined postures on an external storage device and returning all possible matches and filtering the matches by comparing the determined position and gesture against predefined positions and gestures to generate the most probable matching sign;
   at least one communication module for receiving and communicating data from the central processing unit; and
   a speech synthesizer connected to the central processing unit for synthesizing spoken words from the determined sign.

* * * * *